United States Patent [19]

Remick

[11] 4,431,496

[45] Feb. 14, 1984

[54] DEPOLARIZED ELECTROWINNING OF ZINC

[75] Inventor: Robert J. Remick, Naperville, Ill.

[73] Assignee: Institute of Gas Technology, Chicago, Ill.

[21] Appl. No.: 415,162

[22] Filed: Sep. 7, 1982

[51] Int. Cl.³ .............................................. C25C 1/16
[52] U.S. Cl. .................................... 204/119; 204/114
[58] Field of Search ................................ 204/114, 119

[56] References Cited

U.S. PATENT DOCUMENTS 3,103,474  9/1963  Juda ..................................... 204/119
4,279,711  7/1981  Vining et al. ....................... 204/119

*Primary Examiner*—R. L. Andrews
*Attorney, Agent, or Firm*—Thomas W. Speckman

[57] ABSTRACT

A process for electrolytic recovery of zinc wherein metallic zinc is deposited at the cathode while the anode is depolarized through oxidation of iodide ions to iodine, avoiding oxygen evolution at the anode. The iodide ions are chemically regenerated by extracellular oxidation of sulfur dioxide with water to produce iodide ions and hydrogen ions for recycle to the anode compartment. The utilization of iodide ions in the depolarization of the anode results in obtaining good deposits of elemental zinc at high faradic efficiencies resulting in energy saving of 30 to 40 percent over conventional electrowinning of zinc.

45 Claims, 1 Drawing Figure

U.S. Patent
Feb. 14, 1984
4,431,496
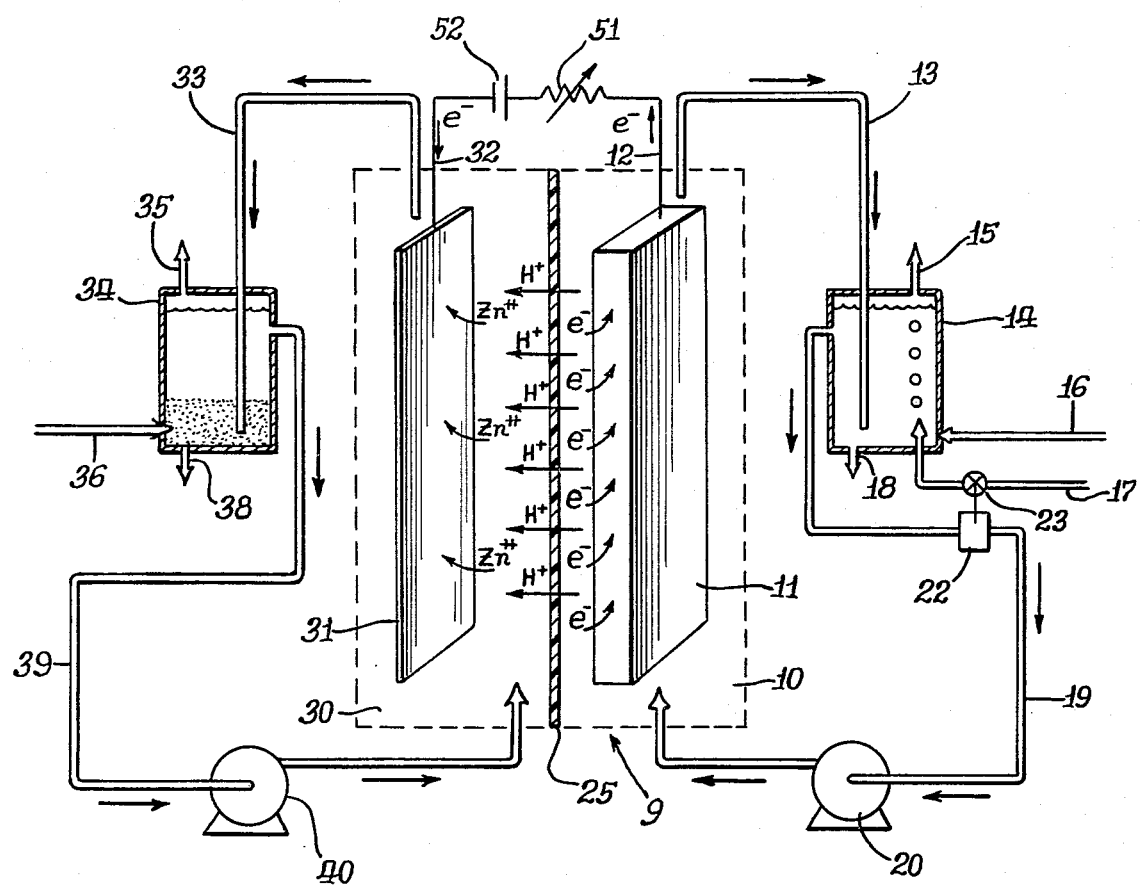

DEPOLARIZED ELECTROWINNING OF ZINC

BACKGROUND OF THE INVENTION

1. Field of the Invention

This invention relates to electrolytic recovery of zinc from its salts, particularly from acid sulfate solutions. Metallic zinc is deposited at the cathode while the anode is depolarized through oxidation of iodide ions to iodine, avoiding oxygen evolution at the anode. The iodide ions are chemically regenerated by the extracellular oxidation of sulfur dioxide with water to produce iodide ions and hydrogen ions for recycle to the anode compartment. The utilization of iodide ions in the depolarization of the anode results in operation of the electrolytic cell at near the decomposition potential for zinc sulfate while obtaining good deposits of elemental zinc at high faradic efficiencies. This results in energy savings of 30 to 40 percent over conventional electrowinning of zinc.

2. Description of the Prior Art

Electrolytic deposition of zinc as a method of zinc recovery from acid zinc sulfate solutions has been practiced: deposition upon lead electrodes taught by U.S. Pat. No. 1,252,654; electrodeposition of zinc on ferrous metals using an alkali salt of fluorine and aluminum chloride in the electrolyte is taught by U.S. Pat. No. 2,446,983 and plating of ferrous metals with zinc for the avoidance of corrosion from an electrolyte containing ammonium chloride, aluminum sulfate and sodium fluoride followed by heat treatment of the coated material is taught by U.S. Pat. No. 3,254,005; and electrolytic deposition of zinc on aluminum from a zinc pyrophosphate plating bath is taught by U.S. Pat. No. 2,511,952 and electroplating of zinc on aluminum using a plating bath with fluotitanate or fluozirconate ion containing plating bath is taught by U.S. Pat. No. 3,079,310.

U.S. Pat. No. 4,059,596 teaches a process for the electrolytic production of sulfuric acid by oxidation of sulfur dioxide in the anode compartment of an electrolysis cell and producing hydrogen in the cathode compartment and utilizing hydrogen iodide or iodine in the anode compartment with sulfur dioxide and water. The '596 patent recognizes the lowering of overvoltage with the use of hydrogen iodide or iodine in the anode compartment for the electrolytic oxidation of sulfur dioxide.

SUMMARY OF THE INVENTION

This invention relates to a process for depolarized electrowinning of zinc to produce metallic zinc. Zinc sulfate is produced in the conventional manner of roasting zinc concentrates which are then leached with sulfuric acid to extract the soluble zinc. The process of this invention utilizes iodide ions in the depolarization of the anode during deposition of zinc at the cathode enabling cell operation at near the decomposition potential for zinc sulfate while obtaining good deposits of elemental zinc at high faradic efficiencies. In the practice of this process an electrical potential of less than 2.5 volts is maintained across a carbon based anode in an anode zone and an aluminum cathode in a cathode zone of a separated electrolytic cell. The anode zone and cathode zone of the electrolytic cell is separated by a hydrogen ion passing membrane. A circulating aqueous anolyte of sulfuric acid, iodide ions and hydrogen ions is passed in contact with the anode oxidizing the iodide ions to iodine and electrons. The anolyte is regenerated by extracellular chemical reaction of iodine, water and sulfur dioxide to form iodide and hydrogen ions and sulfuric acid. The hydrogen ions are transported from the anode zone through the hydrogen ion passing membrance to the cathode zone where a circulating aqueous electrolyte of sulfuric acid and zinc ion is passed in contact with the cathode reducing the zinc ions to metallic zinc.

The electrochemical reactions and extracellular chemical reactions may be represented as follows:

Cathode Reaction

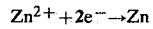

$$Zn^{2+} + 2e^- \rightarrow Zn$$

Anode Reaction

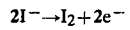

$$2I^- \rightarrow I_2 + 2e^-$$

Extracellular Anolyte Chemical Regeneration Reaction

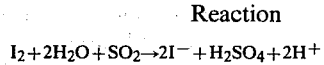

$$I_2 + 2H_2O + SO_2 \rightarrow 2I^- + H_2SO_4 + 2H^+$$

Overall Electrochemical Plus Chemical Reaction

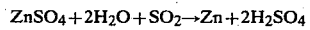

$$ZnSO_4 + 2H_2O + SO_2 \rightarrow Zn + 2H_2SO_4$$

The above reaction system permits operation of the electrolytic cell at electrical potentials of less than about 2.5 volts. The conventional zinc electrowinning electrolytic cell has required voltages in the range of 3.2 to 4.5 volts. The electrochemical reaction of the zinc electrowinning electrolytic cell of this invention is different from the conventional cell by avoiding the formation of molecular oxygen and by depolarizing the anode with iodide ions.

Accordingly, it is an object of this invention to provide a process for the electrolytic recovery of zinc with iodide ion anode depolarization permitting electrolytic cell operation at cell potentials of less than 2.5 volts.

Another object of this invention is to provide a process for high purity and stable zinc electrodeposition.

Yet another object of this invention is to provide a process for depolarizing the anode of a cell used for electrowinning of zinc by direct electrochemical oxidation of iodide ion.

It is still another object of this invention to provide a hybrid electrochemical-chemical process for depolarized electrowinning of zinc in a separated electrolytic cell with circulating electrolytes where in the anolyte is chemically regenerated extracellularly.

These and other objects, advantages and features of this invention will be apparent from the description taken together with the drawing describing preferred embodiments in detail.

BRIEF DESCRIPTION OF THE DRAWING

The FIGURE schematically shows an electrolytic cell together with the circulating electrolyte systems for use in the process of depolarized electrowinning of zinc according to one embodiment of this invention.

DESCRIPTION OF PREFERRED EMBODIMENTS

Referring to the FIGURE, the process for depolarized electrowinning of zinc may be conducted in electrolytic cell 9 comprising anode zone 10 with anode 11 and cathode zone 30 with cathode 31, the anode and cathode zones being separated by hydrogen ion porous separator 25. Separator 25 affords passage of hydrogen ions from the anode compartment to the cathode compartment of the electrolytic cell. An electrical potential is maintained across anode 11 and cathode 31 by an external biased circuit comprising power source 52 and variable control 51 connected across anode lead 12 and cathode lead 32. One of the features of this invention is that an electrical potential of about 1.8 to about 2.5 volts and preferably about 1.8 to about 2.2 volts is suitable for zinc deposition with iodide ion depolarization of the anode. Aqueous sulfuric acid electrolytes are suitable for use in the electrolytic cell according to this invention, about 100 to about 250 gms. $H_2SO_4$/liter being suitable, about 150 to about 200 gms. $H_2SO_4$/liter being preferred for the anolyte and about 175 to about 225 gms. $H_2SO_4$/liter being preferred for the catholyte.

The anolyte provides iodide ions and hydrogen ions to the anode zone depolarizing the anode by oxidation of the iodide ions to iodine with producton of electrons and passage of the hydrogen ions through the hydrogen ion passing membrane separator to the cathode zone, as schematically shown in the FIGURE. The anolyte preferably flows through a porous carbon based anode such as reticulated vitreous carbon have pore volumes of about 80 to about 90 percent. The anolyte passes from anode zone 10 through anolyte exit conduit 13 to anolyte regenerator 14. Anolyte regnerator 14 provides conditions for regeneration of the anolyte according to the extracellular chemical reaction set forth above. Water supply means 16 supplies water to anolyte regenerator 14 for the extracellular chemical reaction set forth above and in combination with sulfuric acid removal conduit 18 provides the desired anolyte sulfuric acid concentration. Sulfur dioxide supply means 17 bubbles sulfur dioxide through regenerator 14 for conduct of the Bunsen reaction set forth above as the extracellular chemical reaction. Vent 15 is provided to vent gases from anolyte regenerator 14. The supply of sulfur dioxide is controlled to be just less than the stoichiometric amount for reaction to prevent sulfur dioxide from passing to the anode zone. This may be controlled by sulfur dioxide analyzer means 22 in anolyte recycle conduit 19 analyzing any sulfur dioxide content in the anolyte and controlling through flow control means 23 the amount of sulfur dioxide being supplied to anolyte regenerator 14. It is desired that the hydrogen ion and iodine ion concentration in the anolyte being recycled to the anode zone be about 10 to about 25 gms/liter, expressed as HI, preferably about 15 to about 20 gms/liter. While the amount of sulfur dioxide provided to the anolyte regenerator is only required to be less than the stoichiometric amount for reaction in the extracellular chemical reaction, it is desired to operate close to that stoichiometric amount and the anolyte regenerator system generally will accommodate about 2 to about 10 volume percent sulfur dioxide which is suitably obtained from zinc ore roasting. The anolyte comprising sulfuric acid, hydrogen ions and iodide ions is recycled to the anode chamber at desired temperature and pressure by anolyte recycle control means 20. Anolyte recycle control means 20 may include any suitable pumping means, temperature control means and rate control means.

The circulating aqueous catholyte passes from cathode chamber 30 by catholyte exit conduit 33 to catholyte regenerator 34. The catholyte is passed over powdered zinc in regenerator 34 to purify the zinc ions in the catholyte, particularly to avoid the presence of copper and iron ions in order to avoid hydrogen production in the cathode zone. Zinc sulfate is provided to the catholyte by zinc sulfate supply means 36 in an amount to provide about 45 to about 70 grams of zinc per liter, preferably about 60 to about 65 grams of zinc per liter. Catholyte regenerator 34 is provided with vent 35 and catholyte regenerator drain 38 to provide adjustment of the materials. Regenerated catholyte comprising sulfuric acid and zinc ions are recycled through recycle conduit 39 and catholyte recycle control means 40 providing pumping, temperature control and rate control for recycle of catholyte to cathode zone 30. It is desired that the circulating catholyte in the cathode compartment be exchanged in about 5 to about 40 minutes, preferably in about 10 to about 20 minutes. Sulfuric acid concentration of the catholyte may be adjusted by control means 40 providing make-up sulfuric acid from sulfuric acid removal conduit 18 or water supply means 16 of the anolyte regenerator.

Cathode 31 is a mechanically replaceable plate cathode of aluminum for conduct of the cathode reaction set forth above plating molecular zinc on the aluminum cathode. The zinc is obtained by mechanical replacement of the cathode by methods well known in the art. The cathode should be replaced when the zinc deposit approaches within one-half inch of the separator, generally after about 24 hours of operation.

Any suitable hydrogen ion passing separator material may be used to separate the anode zone from the cathode zone as long as the separator is stable with respect to the electrolytes and iodine present in the system. Suitable separator materials are well known in the art and include Nafion (a sulfonated perfluoropolyethlyene sold by DuPont), and other fluorocarbon ion exchange membranes.

The electrolytic cell of this invention may be operated at ambient pressures and at temperatures about 25° to about 70° C., preferably about 45° to about 55° C. to promote the electrochemical reactions. Any suitable electrolytic cell configuration may be used in the process of this invention. One preferred configuration is one in which the anode zone is contained within a bag constructed of the hydrogen ion permeable material functioning as a separator. This construction eliminates the need for independent separator support structure.

One of the important features of this invention is the reduction of power requirements for recovery of zinc by electrowinning of zinc sulfate solutions. This is achieved by the anode zone oxidation of iodide ions with electrical potentials of less than about 2.5 volts. The cell voltage provided across the anode and cathode by power source 50 and variable control means 51 is suitably about 1.8 to about 2.5 volts and preferably about 1.8 to 2.2 volts providing a cathode current density of about 50 to about 80 Amps/$Ft^2$, preferably about 60 to about 70 Amps/$Ft^2$.

The process of this invention provides good crystaline-like deposits of high strength zinc at the cathode with reticulated vitreous carbon porous anodes being unchanged during operation. Faradic efficiencies in the order of 90 percent are obtainable with cell voltages of about 2.1 volts.

The following example is set forth solely as exemplary of this invention and should not limit the invention in any way.

EXAMPLE

An electrolytic cell was constructed as shown in the FIGURE havng an anode chamber and cathode chamber separated by a Nafion-415 cation conducting membrane. The cell was fitted with an aluminum plate cathode of 29 cm$^2$ front face area and a porous Reticulated Vitreous Carbon (RVC) anode having a volume of 100 cm$^3$ with 90 percent pore volume and 39 cm$^2$ front face area. The RVC provides very high effective surface area and places a large portion of the anolyte within a fraction of a millimeter from the anode surface, greatly reducing concentration polarization. The spacing between the electrodes was 5.7 cm.

A circulating aqueous anolyte system was provided and maintained with 200 gms H$_2$SO$_4$ and 15.6 gms HI per liter leaving the anolyte regenerator for recycle to the anode compartment. The HI is in the form of 2H$^+$ and 2I$^-$. An anolyte regeneration system was maintained with a bubbler operating with a 4 percent SO$_2$ and 96 percent N$_2$ stream at a rate to maintain a slight iodine color exiting the bubbler thus maintaining the anolyte iodide concentration by the Bunsen reaction.

A circulating catholyte system provided catholyte exchange every 10 minutes and maintained the aqueous catholyte with 200 gms H$_2$SO$_4$ and 264 gms ZnSO$_4$ 7H$_2$O per liter. The catholyte was continuously passed through zinc dust in the catholyte regenerator.

The cell was operated continuously for four hours with a 2.0 ampere constant current, representing 64 A/ft$^2$ on the cathode. The cell operated at 2.10 volts; the anode at +0.03 volts as compared to a Hg/Hg$_2$SO$_4$ reference; and the cathode at $-1.50$ volts as compared to the Hg/Hg$_2$SO$_4$ reference. The IR drop between the electrodes was 0.57 volts.

Good crystalline-like deposit of zinc was obtained which exhibited high strength. The Faradaic efficiency was 89 percent. The RVC anode was unchanged during operation. This demonstrates depolarized zinc electrolysis in a diaphragm cell can be conducted at low voltages, a 40 percent reduction in operating voltage with a 16 percent increase in electrode spacing as compared to standard electrolyzer configuration.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for depolarized electrowinning of zinc comprising: maintaining an electrical potential of about 1.8 to about 2.5 volts across a carbon based anode in an anode zone and an aluminum cathode in a cathode zone of a separated electrolytic cell; passing a circulating aqueous anolyte comprising sulfuric acid, hydrogen ions, and iodide ions in contact with said anode causing oxidation of said iodide ions to iodine and producing electrons; transporting said hydrogen ions through a cation passing membrane to said cathode zone; passing a circulating aqueous catholyte comprising sulfuric acid and zinc ions in contact with said cathode causing reduction of said zinc ions to metallic zinc on said cathode; and circulating said anolyte through an extra cellular anolyte regenerator chemically reacting sulfur dioxide, iodine, and water to form iodide ions, hydrogen ions and sulfuric acid for recycle to said anode zone.

2. The process of claim 1 wherein said anolyte comprises about 100 to about 250 grams/liter H$_2$SO$_4$.

3. The process of claim 1 wherein said anolyte comprises about 150 to about 200 grams/liter H$_2$SO$_4$.

4. The process of claim 1 wherein said anolyte comprises hydrogen ions and iodide ions, expressed as HI, in about 10 to about 25 grams/liter.

5. The process of claim 1 wherein said anolyte comprises hydrogen ions and iodide ions, expressed as HI, in about 15 to about 20 grams/liter.

6. The process of claim 3 wherein said anolyte comprises hydrogen ions and iodide ions, expressed as HI, in about 15 to about 20 grams/liter.

7. The process of claim 1 wherein said sulfur dioxide is supplied to said extracellular anolyte regenerator in an amount less than stoichiometrically required for regenerating said iodide ions.

8. The process of claim 6 wherein said sulfur dioxide is supplied to said extracellular anolyte regenerator in an amount less than stoichiometrically required for regenerating said iodide ions.

9. The process of claim 1 wherein said sulfur dioxide is supplied to said extracellular anolyte regenerator in an amount of about 2 to about 10 volume percent.

10. The process of claim 6 wherein said sulfur dioxide is supplied to said extracellular anolyte regenerator in an amount of about 2 to about 10 volume percent.

11. The process of claim 1 wherein said carbon based anode is reticulated vitreous carbon having pore volumes of about 80 to about 90 percent.

12. The process of claim 10 wherein said carbon based anode is reticulated vitreous carbon having pore volumes of about 80 to about 90 percent.

13. The process of claim 1 wherein said catholyte comprises about 100 to about 250 grams/liter H$_2$SO$_4$.

14. The process of claim 1 wherein said catholyte comprises about 175 to about 225 grams/liter H$_2$SO$_4$.

15. The process of claim 12 wherein said catholyte comprises about 175 to about 225 grams/liter H$_2$SO$_4$.

16. The process of claim 1 wherein said catholyte comprises about 45 to about 70 grams/liter Zn.

17. The process of claim 1 wherein said catholyte comprises about 60 to about 65 grams/liter Zn.

18. The process of claim 15 wherein said catholyte comprises about 60 to about 65 grams/liter Zn.

19. The process of claim 1 wherein said potential is about 1.8 to about 2.2 volts.

20. The process of claim 18 wherein said potential is about 1.8 to about 2.2 volts.

21. The process of claim 1 wherein the current density on the cathode is about 50 to about 80 Amps/Ft$^2$.

22. The process of claim 1 wherein the current density on the cathode is about 60 to about 70 Amps/Ft$^2$.

23. The process of claim 20 wherein the current density on the cathode is about 60 to about 70 Amps/Ft$^2$.

24. The process of claim 1 wherein said circulating catholyte provides catholyte exchange in about 5 to about 40 minutes.

25. The process of claim 1 wherein said circulating catholyte provides catholyte exchange in about 10 to about 20 minutes.

26. The process of claim 23 wherein said circulating catholyte provides catholyte exchange in about 10 to about 20 minutes.

27. The process of claim 1 wherein said circulating catholyte passes over powdered zinc in a catholyte regeneration zone for purification and recycle to said cathode zone.

28. The process of claim 26 wherein said circulating catholyte passes over powdered zinc in a catholyte regeneration zone for purification and recycle to said cathode zone.

29. The process of claim 1 wherein said cation passing membrane is Nafion.

30. The process of claim 28 wherein said cation passing membrane is Nafion.

31. The process of claim 1 wherein said anode zone is contained within a bag constructed of said hydrogen ion passing membrane.

32. The process of claim 30 wherein said anode zone is contained within a bag constructed of said Nafion.

33. A process of depolarizing the anode of a zinc electrowinning cell having an electrical potential across an aluminum cathode in a cathode zone and a carbon based anode in an anode zone of a separated cell comprising: passing a circulating aqueous anolyte comprising sulfuric acid, hydrogen ions and iodide ions in contact with said anode causing oxidation of said iodide ions to iodine and producing electrons, thereby avoiding molecular oxygen formation.

34. The process of claim 33 comprising the additional steps of circulating said aqueous anolyte comprising iodine to an extracellular anolyte regenerator, contacting said anolyte in said regenerator with sulfur dioxide causing reduction of said iodine to iodide ions and formation of hydrogen ions and sulfuric acid for recycle to said anode zone.

35. The process of claim 33 wherein said anolyte comprises about 100 to about 250 grams/liter $H_2SO_4$.

36. The process of claim 33 wherein said anolyte comprises about 150 to about 200 grams/liter $H_2SO_4$.

37. The process of claim 33 wherein said anolyte comprises hydrogen ions and iodide ions, expressed as HI, in about 10 to about 25 grams/liter.

38. The process of claim 33 wherein said anolyte comprises hydrogen ions and iodide ions, expressed as HI, in about 15 to about 20 grams/liter.

39. The process of claim 36 wherein said anolyte comprises hydrogen ions and iodide ions, expressed as HI, in about 15 to about 20 grams/liter.

40. The process of claim 34 wherein said sulfur dioxide is supplied to said extracellular anolyte regenerator in an amount less than stoichiometrically required for regenerating said iodide ions.

41. The process of claim 39 comprising the additional steps of circulating said aqueous anolyte comprising iodine to an extracellular anolyte regenerator, contacting said anolyte in said regenerator with sulfur dioxide causing reduction of said iodine to iodide ions and formation of hydrogen ions and sulfuric acid for recycle to said anode zone and wherein said sulfur dioxide is supplied to said extracellular anolyte regenerator in an amount less than stoichiometrically required for regenerating said iodide ions.

42. The process of claim 34 wherein said sulfur dioxide is supplied to said extracellular anolyte regeneraor in an amount of about 2 to about 10 volume percent.

43. The process of claim 39 comprising the additional steps of circulating said aqueous anolyte comprising iodine to an extracellular anolyte regenerator, contacting said anolyte in said regenerator with sulfur dioxide causing reduction of said iodine to iodide ions and formation of hydrogen ions and sulfuric acid for recycle to said anode zone and wherein said sulfur dioxide is supplied to said extracellular anolyte regenerator in an amount of about 2 to about 10 volume percent.

44. The process of claim 33 wherein said carbon based anode is reticultated vitreous carbon having pore volumes of about 80 to about 90 percent.

45. The process of claim 43 wherein said carbon based anode is reticulated vitreous carbon having pore volumes of about 80 to about 90 percent.

* * * * *